(12) United States Patent
Om et al.

(10) Patent No.: US 7,038,506 B2
(45) Date of Patent: May 2, 2006

(54) AUTOMATIC SELECTION OF AN ON-CHIP ANCILLARY INTERNAL CLOCK GENERATOR UPON RESETTING A DIGITAL SYSTEM

(75) Inventors: Ranjan Om, New Delhi (IN); Fabio Carlucci, Milan (IT)

(73) Assignees: STMicroelectronics Pvt. Ltd., Uttar Pradesh (IN); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/806,938

(22) Filed: Mar. 23, 2004

(65) Prior Publication Data

US 2005/0212571 A1 Sep. 29, 2005

(51) Int. Cl.
*H03L 7/00* (2006.01)

(52) U.S. Cl. .................... 327/145; 327/407; 327/99

(58) Field of Classification Search ........ 327/141–145, 327/105, 107, 113, 114, 291–294, 298, 407, 327/99
See application file for complete search history.

(56) References Cited

U.S. PATENT DOCUMENTS

| 5,025,387 | A | * | 6/1991 | Frane .......................... 713/322 |
| 5,218,704 | A | * | 6/1993 | Watts, Jr. et al. ............ 713/322 |
| 5,510,741 | A |   | 4/1996 | Childs .......................... 327/143 |
| 5,517,109 | A | * | 5/1996 | Albean et al. ............. 324/158.1 |
| 5,652,536 | A | * | 7/1997 | Nookala et al. ............. 327/298 |
| 5,801,561 | A | * | 9/1998 | Wong et al. ................. 327/143 |
| 5,877,636 | A | * | 3/1999 | Truong et al. ................. 327/99 |
| 5,912,570 | A | * | 6/1999 | Kuusisto ..................... 327/142 |
| 5,930,516 | A | * | 7/1999 | Watts, Jr. et al. ........... 713/322 |
| 6,147,537 | A | * | 11/2000 | Sasaki ......................... 327/298 |
| 6,292,038 | B1 | * | 9/2001 | Stachura et al. ............ 327/145 |
| 6,473,852 | B1 | * | 10/2002 | Hanjani ......................... 713/1 |
| 6,487,668 | B1 | * | 11/2002 | Thomas et al. ............. 713/322 |
| 6,771,100 | B1 | * | 8/2004 | Ishimi ......................... 327/142 |
| 6,806,755 | B1 | * | 10/2004 | Simmonds .................. 327/298 |
| 6,809,556 | B1 | * | 10/2004 | Bronfer et al. ............... 327/99 |
| 6,891,409 | B1 | * | 5/2005 | Furuya ........................ 327/141 |

* cited by examiner

*Primary Examiner*—Timothy P. Callahan
*Assistant Examiner*—Hai L. Nguyen
(74) *Attorney, Agent, or Firm*—Lisa K. Jorgenson; Allen, Dyer, Doppelt, Milbrath & Gilchrist, P.A.

(57) ABSTRACT

A digital logic system includes a reset input for receiving a reset signal, and a clock input for receiving an externally generated main clock signal. An ancillary clock generator generates an ancillary clock signal. A clock selection multiplexer has a first input for receiving the externally generated main clock signal, a second input for receiving the internally generated ancillary clock signal, and an output for providing the externally generated main clock signal or the internally generated ancillary clock signal to a functional circuit. A resettable edge-triggered shift register has a first input for receiving the externally generated main clock signal, a second input for receiving the reset signal, and an output connected to the clock selection multiplexer for deselecting the internally generated ancillary clock signal and selecting the externally generated main clock signal after detecting a certain number of edges of the main clock signal following the reset signal.

20 Claims, 2 Drawing Sheets

_US 7,038,506 B2_

AUTOMATIC SELECTION OF AN ON-CHIP ANCILLARY INTERNAL CLOCK GENERATOR UPON RESETTING A DIGITAL SYSTEM

FIELD OF THE INVENTION

The present invention relates to digital logic systems including a reset signal generator for resetting a system at power-up and/or during operation, and a clock generator for generating a main clock signal that is distributed to functional circuits of the system.

BACKGROUND OF THE INVENTION

Initialization of digital logic systems at power-up or at certain occurrences during operation is a critical phase. Automotive applications as well as many other microcontroller based supervising and diagnostic systems must ensure the highest level of safety, including diagnostic capabilities even under harsh environmental conditions. To ensure that the system is able to recover from a malfunction and perform appropriate corrective actions under any circumstances, it becomes important that the system be able to correctly exit from a system reset phase.

Apart from ensuring the correct generation of the reset signal, it is fundamentally important to timely provide the necessary clock signal to all the functional circuits of the system. Because of these requirements in practically any safety type system, many approaches have been developed. Most of these approaches are based on the availability of multiple clock inputs to the system. The system can switch from a failing clock source to a correctly working one, either under microprocessor control or by appropriate hardware functioning independently and/or cooperatively with the application software running on the system.

One known approach is described in U.S. Pat. No. 5,510,741 Childs, in which a reset and clock circuit provides a valid power-up reset signal prior to distribution of a clock signal for placing the system in a known state. Another reset and clock circuit maintains distribution of the clock signal for a predetermined time interval following a drop of the power supply voltage.

Notwithstanding the efforts so far expended there is still a need for a relatively straightforward and cost effective implementation capable of preventing corruption or loss of data that may occur because of glitches or other imperfections of the externally generated main clock signal being distributed to the functional circuits of the system. This is during the critical exiting from a system reset phase, and the resumption of normal operation of the system, whether it follows a power-up or an execution of a recovery routine from a malfunction.

SUMMARY OF THE INVENTION

In view of the foregoing background, an object of the present invention is to provide a straightforward and effective approach for automatically selecting for distribution to the functional circuits of a digital logic system an internally generated ancillary clock signal by temporarily deselecting the externally generated main clock signal at any reset, and thereafter switching back to distribute the externally generated main clock signal after having verified a certain number of main clock edges following a reset signal.

To complete the reset phase and ensure that system is gracefully put into a safe state in case of an external clock failure across a reset event, the stability of an internal clock generator is to be ensured. In other words, the internal clock generator should be stable enough (after relaxation) to be able to allow the system to run diagnostics and signal the failure of the system clock.

The maximum frequency of the internally generated ancillary clock should remain lower than a safe value for assuring that no part of the device may malfunction when fed with the internally generated clock. This is assured by employing an internal clock having a frequency lower than the frequency of the externally generated main system clock.

By including an on-chip (internal) ancillary clock generator having a sufficient short-term frequency stability to ensure a stable clock frequency for the normal duration of a reset phase, and by automatically selecting an internally generated ancillary clock in lieu of the externally generated main clock for a programmable interval of time, corresponding to a certain number of main clock edges to be correctly monitored before reverting to distribute the main clock signal throughout the system, the probability of corruption or loss of data during the critical phase of completing the reset and resuming normal operation may be made practically negligible.

The added ancillary internal clock generator may be a straightforward ring/RC oscillator that is slightly affected in its functionality by the external environmental conditions and thermo-mechanical stresses. Though unsuitable to ensure a long-term stability such as provided by a quartz crystal stabilized external main clock generator, the ancillary internal ring/RC oscillator does not suffer from thermo-mechanical stresses and other abruptly changing environmental conditions that, by contrast, are likely to severely effect short term stability of the main external clock generator.

According to the present invention, during the critical phases of reset and of resuming normal operation, whether at power up or at any other moment of operation of the system, initialization errors following a reset that may arise from accidental concurrent imprecisions of the externally generated main clock signal are effectively prevented.

DETAILED DESCRIPTION OF THE PREFERRED EMBODIMENTS

Figure 1:
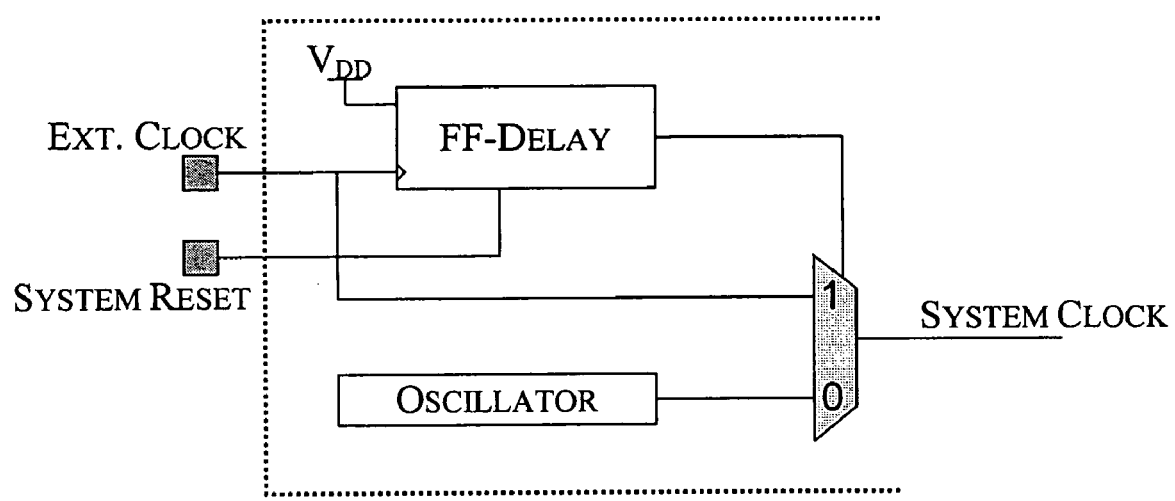
FIG. 1 is a block diagram of a digital logic system including an ancillary clock generator and a clock selection device in accordance with the present invention.

Referring to FIG. 1, the integrated digital logic system is formed in an IC chip identified by the partial dotted line contour. As shown, a main external clock signal that may be generated by a dedicated crystal oscillator is fed to the integrated system. Moreover, the system receives appropriate reset commands generated by dedicated circuitry according to common practices in the art.

According to the present invention, an ancillary internal clock generator (OSCILLATOR), for example, in the form of a ring/RC oscillator having sufficient short-term frequency stability with respect to the normal duration of a reset phase, is integrated on the system chip. Its output is coupled to one input node of a selection multiplexer, to a second input node of which is fed the externally generated main clock signal.

The selected clock is made available at the output of the multiplexer and is distributed to the functional circuits of the system (SYSTEM CLOCK). Automatic selection of the ancillary internally generated clock signal is implemented upon the arrival of a system reset pulse to the resettable shift register (FF-DELAY), which is fed with the externally generated main clock.

The edge triggered resettable shift register (FF-DELAY) deselects the internally generated ancillary clock, which is automatically selected at the arrival of the system reset pulse, and selects the externally generated main clock after detecting a programmable number of main clock edges following the reset pulse.

Moreover, the shift register (FF-DELAY) acts as a filter for glitches that may be present in the external clock signal. Glitches on the external clock are potentially dangerous since they can force the delay block (FF-DELAY), i.e., the mux selector, to change state, and consequently, prematurely and unduly switch the clock to a still unstable external source. The deeper (i.e., the larger the number of stages of the shift register) the multiplexer selecting shift register (FF-DELAY) is designed, the more robust the structure is against glitches based upon the hypothesis that a glitch may determine a spurious extra clock cycle. Theoretically, a glitch can even be so short to induce incorrect states in the logic circuitry it reaches (like a timing violation). To contrast this, the shift register may be designed to minimize such an effect.

For example, the external clock can be applied to a single toggle-type flip-flop whose output is then fed in lieu of the external clock to the rest (input) of the edge-triggered resettable shift register (counter). In this way a glitch may be able to corrupt only the first flip-flop but the effect of this anomaly would be significantly reduced at the output of the shift register, thus preventing spurious selections in the multiplexer.

The result is that the system switches to the externally generated main clock only after correct activity of the external main clock generator has been verified. This prevents the occurrence of corruptions due to glitches or imprecisions that could accidentally occur on the externally generated main clock signal during the critical reset phase.

The ancillary internal clock generator has sufficient short-term frequency stability covering the expected duration of a reset phase, and differently from the external main clock generator, is much less likely to be affected by external environmental conditions and thermo-mechanical stresses. The number of external clock edges to be counted before returning to distribute the externally generated main clock signal can be programmed according to needs and according to the stability characteristics of the ancillary internal clock generator.

Figure 2:
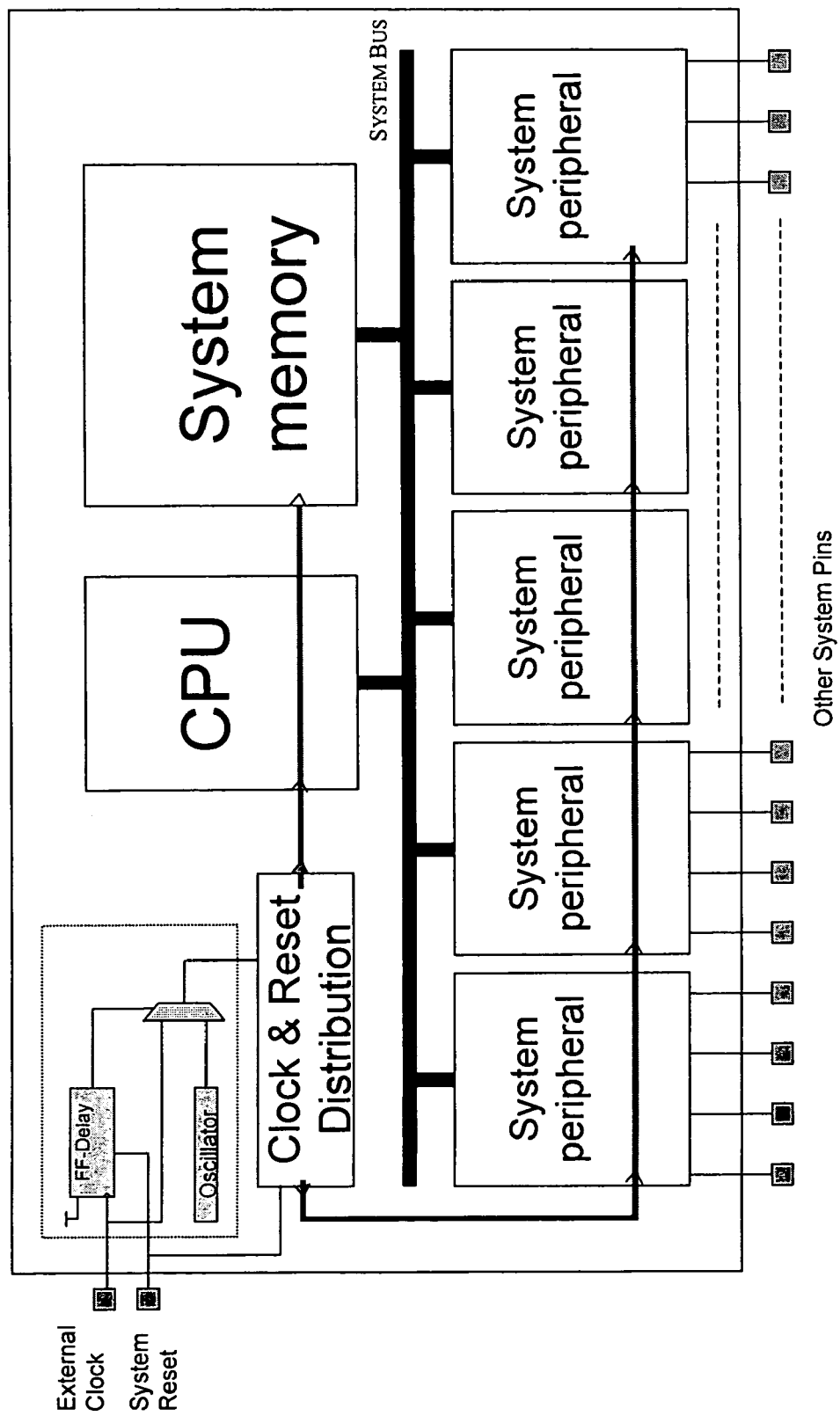
FIG. 2 is a more detailed block diagram of the digital logic system illustrated in FIG. 1.

A sample embodiment of the present invention in a common microcontroller system is schematically illustrated in FIG. 2. The clock signal generated by the device is input to a circuit CLOCK & RESET DISTRIBUTION that distributes the recovered clock and the reset signal to all the functional blocks of the microcontroller system.

That which is claimed is:

1. A digital logic system comprising:
    a reset input for receiving a reset signal;
    a clock input for receiving an externally generated main clock signal;
    an ancillary clock generator for generating an ancillary clock signal independent of the externally generated main clock signal and having short term frequency stability in relation to an expected duration of a system reset phase;
    at least one functional circuits;
    a clock selection multiplexer having a first input for receiving the externally generated main clock signal, a second input for receiving the ancillary clock signal, and an output for providing the externally generated main clock signal or the ancillary clock signal to said at least one functional circuit; and
    a resettable edge-triggered shift register having a first input for receiving the externally generated main clock signal, a second input for receiving the reset signal, and an output connected to said clock selection multiplexer for deselecting the ancillary clock signal and selecting the externally generated main clock signal after detecting a certain number of edges of the main clock signal following the reset signal.

2. A digital logic system according to claim 1, wherein said ancillary clock generator comprises a ring/RC oscillator.

3. A digital logic system according to claim 1, wherein said resettable edge-triggered shift register comprises a plurality of stages for preventing glitches that may be present on the externally generated main clock signal.

4. A digital logic system according to claim 1, further comprising a toggle flip-flop between the first input of said resettable edge-triggered shift register and the clock input.

5. A digital logic system according to claim 1, wherein a frequency of the ancillary clock signal is less than a frequency of the main clock signal.

6. A digital logic system comprising:
    a reset input for receiving a reset signal;
    a clock input for receiving an externally generated main clock signal;
    an ancillary clock generator for generating an ancillary clock signal independent of the externally generated main clock signal;
    a clock selection multiplexer having a first input for receiving the externally generated main clock signal, a second input for receiving the ancillary clock signal, and an output for providing the externally generated main clock signal or the ancillary clock signal; and
    a shift register having a first input for receiving the externally generated main clock signal, a second input for receiving the reset signal, and an output connected to said clock selection multiplexer for deselecting the ancillary clock signal and selecting the externally generated main clock signal after detecting a certain number of edges of the main clock signal following the reset signal.

7. A digital logic system according to claim 6, wherein said ancillary clock generator comprises a ring/RC oscillator.

8. A digital logic system according to claim 6, wherein said shift register comprises a plurality of stages.

9. A digital logic system according to claim 6, further comprising a toggle flip-flop between the first input of said shift register and the clock input.

10. A digital logic system according to claim 6, wherein a frequency of the ancillary clock signal is less than a frequency of the main clock signal.

11. A digital system comprising:
    a reset circuit for generating a reset signal;
    a main clock generator for generating a main clock signal;

an ancillary clock generator for generating an ancillary clock signal independent of the externally generated main clock signal;

at least one functional circuit;

a clock selection multiplexer having a first input for receiving the main clock signal, a second input for receiving the ancillary clock signal, and an output for providing the main clock signal or the ancillary clock signal to said at least one functional circuit; and a resettable edge-triggered shift register having a first input for receiving the main clock signal, a second input for receiving the reset signal, and an output connected to said clock selection multiplexer for deselecting the ancillary clock signal and selecting the main clock signal after detecting a certain number of edges of the main clock signal following the reset signal.

12. A digital system according to claim 11, wherein said ancillary clock generator comprises a ring/RC oscillator.

13. A digital system according to claim 11, wherein said shift register comprises a plurality of stages.

14. A digital system according to claim 11, further comprising a toggle flip-flop between the first input of said shift register and said main clock generator.

15. A digital system according to claim 11, wherein a frequency ol the ancillary clock signal is less than a frequency of the main clock signal.

16. A method for resetting a digital logic system comprising a reset input for receiving a reset signal and a clock input for receiving an externally generated main clock signal, the method comprising:

generating an ancillary clock signal independent of the externally generated main clock signal;

providing the externally generated main clock signal and the ancillary clock signal to respective first and second inputs of a clock selection multiplexer, and providing at an output of the clock selection multiplexer the externally generated main clock signal or the ancillary clock signal to at least one functional circuit; and providing the externally generated main clock signal and the reset signal to respective first and second inputs of a resettable edge-triggered shift register, and an output of the resettable edge-triggered shift register being connected to the clock selection multiplexer for deselecting the ancillary clock signal and selecting the externally generated main clock signal after the resettable edge-triggered shift register detects a certain number of edges of the main clock signal following the reset signal.

17. A method according to claim 16, wherein the ancillary clock generator comprises a ring/RC oscillator.

18. A method according to claim 16, wherein the resettable edge-triggered shift register comprises a plurality of stages.

19. A method according to claim 16, wherein the digital logic system further comprises a toggle flip-flop between the first input of the resettable edge-triggered shift register and the clock input.

20. A method according to claim 16, wherein a frequency of the ancillary clock signal is less than a frequency of the main clock signal.

* * * * *

UNITED STATES PATENT AND TRADEMARK OFFICE
CERTIFICATE OF CORRECTION

| | | |
|---|---|---|
| PATENT NO. | : 7,038,506 B2 | Page 1 of 1 |
| APPLICATION NO. | : 10/806938 | |
| DATED | : May 2, 2006 | |
| INVENTOR(S) | : Ranjan Om and Fabio Carlucci | |

It is certified that error appears in the above-identified patent and that said Letters Patent is hereby corrected as shown below:

Column 5, Line 25    Delete: "ol the"

Insert: -- of the --

Signed and Sealed this

Seventh Day of November, 2006

JON W. DUDAS
*Director of the United States Patent and Trademark Office*